United States Patent Office 2,996,462
Patented Aug. 15, 1961

2,996,462
ADHESIVE COMPOSITION COMPRISING GELATINIZED STARCH, UNGELATINIZED STARCH, AND POLYVINYL ACETATE
Albert R. Robbins, Maplewood, N.J., assignor to Stein, Hall & Co., Inc., New York, N.Y., a corporation of New York
No Drawing. Filed Apr. 28, 1958, Ser. No. 731,117
7 Claims. (Cl. 260—17.4)

This invention relates to adhesives and, more particularly, to a starch-polyvinyl acetate adhesive which is suitable for the purpose of making laminated and corrugated paper and board.

In the manufacture of corrugated paperboard, it is not essential that the adhesive used should form a bond of extremely high agglutinant strength inasmuch as it is only necessary that the bond be slightly stronger than the paper itself. The essential feature necessary in an adhesive for single-face, double-face and double-wall corrugated paperboard is the ability to rapidly form a bond between two paper surfaces under conditions of heat, pressure and contact between the surfaces, which are seldom optimum jointly or severally.

When laminated and corrugated paperboard is manufactured on high speed bonding machines, the strips of paper are fed continuously from supply rolls. When the desired product is corrugated paperboard, one or more of the paper strips received from the supply rolls is corrugated by passing the strip between, for example, intermeshing heated, fluted rolls. If desired, the paper strip to be corrugated may be passed first between steam jets to moisten and soften the paper, thereby facilitating the corrugating operation. After the corrugating step is performed, adhesive is applied only to the tips of the corrugations just before the tips are brought into contact with one or more liners for bonding therewith. When the desired product is laminated paperboard, adhesive is mechanically and continuously applied to the surfaces to be joined as the paper strips are received from the supply rolls, and thereafter the surfaces are brought together by means of guides and pressure rolls, plates, or the like.

Commercial bonding apparatus, for continuously joining strips of paper to form laminated or corrugated paperboard, is designed to operate at high speeds, for example between 175 to 550 feet of paperboard per minute. The use of such high speeds greatly limits the choice of adhesives which may be utilized.

It is not feasible to apply considerable pressure to the paper plies during the bonding operation particularly at the high speeds employed. In the case of corrugated paperboard there is always the danger of crushing the corrugations. As a result, poor contact between the plies to be bonded may frequently occur. It is therefore desirable that the adhesive have sufficient viscosity so that it will "stand up" on the surfaces of the paper and fill in any areas of poor contact.

The materials heretofore and at present in use as adhesives in the manufacture of laminated and corrugated paperboard on an industrial scale require, as an essential part of the machinery, a heating section or zone of a length dependent upon the speed of the board, the ability of the board to transmit heat from the place of application to the points or area of bonding, and the temperature of the heating zone. It will be appreciated that each of these factors constitutes a serious limitation in the manufacture of multi-ply paperboard.

The temperature of the heating zone and the residence time of the board in the heating zone must not be so great as to scorch or weaken the paper and it must be relatively low if the paper has been pretreated by waxing, impregnating, or like operations. On the other hand, the temperature of the heating zone and the residence time of the board therein must be high enough to obtain a reasonable operating speed. The heavier the weight of the multi-ply paperboard, the greater must be the residence time of the board in the heating zone or the temperature of the heating zone. The normal operating temperatures vary from 140° F. up to 400° F.

Starch is presently in use as an adhesive in the manufacture of laminated and corrugated paperboard on an industrial scale. It has been found, however, that in order to obtain proper bonding using starch adhesives that the corrugating machines are run below their maximum speed. Further, the residence time of the starch in the heating zone is lengthy due to the fact that gelatinization of the starch must take place in the heating zone in order to insure proper bonding.

Attempts to overcome the deficiencies of starch such as by the use of polyvinyl acetate have proven unsatisfactory. The polyvinyl acetate is thermoplastic and hence at the high operating temperatures, above 300° F. necessary to plasticize the paper in the flute-forming operation, the polyvinyl acetate tends to soften and spread rather than remain on the flute tips, when the bonding takes place. It will not "stand up" on the surfaces of the paper and fill in any areas of poor contact.

Various extenders and carriers such as gelatinized starch, ungelatinized starch or starch derivatives, such as dextrine, have been added to polyvinyl acetate to prevent the softening and spreading of the polyvinyl acetate on the flute tips. Such extenders and carriers have proven unsuccessful, the polyvinyl acetate still being thermoplastic at the high operating temperatures employed in the flute-forming operation.

It is an object of this invention to provide an adhesive which permits rapid and positive bonding at elevated temperatures.

It is a further object of the invention to provide a starch-polyvinyl acetate adhesive which permits increased speeds of operation in the manufacture of corrugated board.

Briefly, the foregoing objects are realized according to the present invention by the combination of starch and polyvinyl acetate in such proportions, as will be illustrated presently, that the resulting adhesive will permit fast and positive bonding by the machines normally used in the manufacture of corrugated board.

The problem sought to be overcome by the present invention recognizes that if the adhesive dries out too quickly after application there is not sufficient time to form a good bond. On the other hand, if a satisfactory bond is formed, subsequent heat may cause the adhesive to flow too much and thus reduce its effectiveness.

It has been found that by combining critical portions of polyvinyl acetate and gelatinized and ungelatinized starch to form an adhesive that the speed of operation in the manufacture of corrugated board is greatly increased and that the adhesive obtained permits fast and positive bonding at elevated temperatures. The superior results obtained by using the starch-polyvinyl acetate adhesives are found to exist in both acid and alkaline formulae.

Representative preparations of adhesive compositions in accordance with the present invention are illustrated as follows:

*Example I*

An alkaline starch mixture was first made as follows:

Primary mixture:
    790 lbs. water
    180 lbs. pearl cornstarch
    32 lbs. caustic soda This mixture was heated to 160° F. and held at this temperature for fifteen minutes under agitation in order to gelatinize the starch. Five hundred and forty pounds (540 lbs.) of water was then added and agitation continued for five minutes.

Secondary mixture:
    3400 lbs. water
    38 lbs. 10 mol borax
    1020 lbs. pearl cornstarch The primary mixture was then added slowly to the secondary mixture and agitated for ten to fifteen minutes. This was the completed starch portion.

To this completed starch portion, five hundred pounds (500 lbs.) of 55% solids borax compatible polyvinyl acetate was added, and the final mix agitated for fifteen minutes. These figures are based on a 700 gallon batch. The starch-polyvinyl acetate adhesive was then used to prepare corrugated paperboard. Rapid, positive bonding was obtained with the adhesive "standing up" on the surface of the paper and filling in the areas of poor contact.

*Example II*

An acid starch mixture was first made as follows:

Primary mixture:
    584 lbs. water
    120 lbs. pearl cornstarch
    1.5 lbs. caustic soda This mixture was heated to 160° F. and held at this temperature for fifteen minutes under agitation to permit gelatinization.

Secondary mixture:
    1418 lbs. water
    65 lbs. aluminum sulfate
    6 lbs. sodium chloride
    640 lbs. tapioca starch The primary mixture was then added slowly to the secondary mixture and agitated for 10 minutes. The pH of this completed acid starch mixture was 3.5–4.0.

To this completed starch mixture was added 140 lbs. of 55% solids polyvinyl acetate, and the final mix was agitated for 10 minutes. The starch-polyvinyl acetate adhesive was then used.

*Example III*

An alkaline starch mixture was first made as follows:

Primary mixture:
    2000 lbs. water
    530 lbs. pearl cornstarch
    85 lbs. caustic soda This mixture was heated to 160° F. and held at this temperature for fifteen minutes under agitation. The starch was thereby gelatinized.

Secondary mixture:
    7900 lbs. water
    65 lbs. borax (5 mol)
    2870 lbs. pearl cornstarch
    25 lbs. "Corsize" (commercial gum karaya thickener)

The primary mixture was then slowly added to the secondary mixture and agitated for fifteen minutes. This was the completed alkaline starch portion.

To this completed starch portion, one hundred and ninety pounds (190 lbs.) of 55% solids borax compatible polyvinyl acetate was added, and the final mix agitated for fifteen minutes. These figures are based on an approximately 1900 gallon batch. The adhesive was then used to bond corrugated paper.

The relative amounts of gelatinized starch, ungelatinized starch and polyvinyl acetate in the adhesive may be varied to some extent but the addition of polyvinyl acetate to the starch must be carefully regulated so as not to have the gelatinization point of the starch outside of the operating range of the corrugating machinery. The polyvinyl acetate, as set forth above, has been successfully incorporated in a number of various starch formulations in amounts between 0.5% to 10% of the total adhesive formula weight. It is preferred however to incorporate from 1% to 6.0% of polyvinyl acetate. The amount of starch in the adhesive formula can be varied from about 14% to 25%, but it is preferred to use amounts ranging from 14% to 21% of the total adhesive formula weight.

The ratio of gelatinized to ungelatinized starch in the starch portion of the adhesive may be varied through a wide range while still obtaining satisfactory results. The ratio can vary from 17 parts by weight gelatinized starch to 3 parts by weight ungelatinized starch, to 1 part by weight gelatinized starch to 12 parts by weight ungelatinized starch. Within this broad operative range of ratios, the desired range of ratios is from 1 part by weight gelatinized starch to 3 parts by weight ungelatinized starch, to 1 part by weight gelatinized starch to 8 parts by weight ungelatinized starch. It is, however, preferred to have a ratio of 1 part by weight gelatinized starch to about 6 parts by weight of ungelatinized starch.

There are several types of starch available, the characteristics being dependent on the source. Cornstarch is preferred because it gives a stiff gel and is available with uniform properties. However, other starches such as potato, cassava (tapioca), rice or wheat may be used, if desired.

Various additives can be added to the polyvinyl acetate-starch composition to obtain specific results such as preservatives, water-conditioners, penetration control agents, etc. For example, if an adhesive with greater water resistance is desired, the incorporation of urea or melamine-formaldehyde resins, 5% solids based on the starch content, will improve the water resistance.

The use of the adhesives of the present invention permits a shorter residence time in the heating section of the corrugating machinery and further permits higher operating speeds than the conventional starch adhesives under identical operating conditions. The following comparative tests illustrate these unexpected improvements.

*Example IV*

A conventional starch adhesive was used to bond corrugated paper on three different corrugating machines. The amount of corrugated paper produced, expressed in feet per minute, and the residence time in the heating section necessary to give good bonding were measured. Three runs were then made using the same procedure but with the starch-polyvinyl acetate adhesive. The starch portion was similar in amount and characteristics to the starch used in the first three runs. The results were as follows:

| Adhesive | Machine | Grade of Paper | Length of Heating Section, ft. | Residence Time, seconds | Operating Speed (f.p.m.) |
| --- | --- | --- | --- | --- | --- |
| 1. Starch | Langston 78" | 90-26-90-26-90 | 28 | 13.2 | 125 |
| 2. Starch | Swift 78" | 42-26-38-26-69 | 36 | 12.0 | 180 |
| 3. Starch | Langston 74" | 90-26-90 | 32 | 12.6 | 150 |
| 4. Starch and polyvinyl acetate | Langston 78" | 90-26-90-26-90 | 28 | 7.8 | 220 |
| 5. Starch and polyvinyl acetate | Swift 78" | 42-26-38-26-69 | 36 | 7.2 | 290 |
| 6. Starch and polyvinyl acetate | Langston 74" | 90-26-90 | 32 | 6.3 | 300 |

The comparative tests clearly indicate that increased operating speeds, up to 100%, and shorter residence times can be obtained using the starch-polyvinyl acetate adhesives and that effective bonding was obtained.

The use of the starch-polyvinyl acetate composition in the approximate proportions described, has several advantages over the use of either starch or polyvinyl acetate alone. The new starch-polyvinyl acetate compositions permit faster, more positive bonding with conventional machinery than the conventional starch adhesive. This in turn permits the use of faster operating speeds, as noted above. Compared to polyvinyl acetate adhesives, the compositions of the present invention can be used in the high operating temperatures necessary to plasticize the paper in the flute-forming operation. Such high operating temperatures are above 300° F. In this range the polyvinyl acetate adhesives tend to soften and spread, rather than remain on the flute tips where bonding takes place. The combination starch-polyvinyl acetate adhesives in the proportions given above overcome this disadvantage while at the same time they are decidedly more economical than polyvinyl acetate adhesives. The primary aim in the use of the starch-polyvinyl actate adhesive has been to obtain a more positive bond at higher operating speeds than have heretofore been possible, and to do this economically.

All modifications or variations to which the invention is susceptible by one skilled in the art are intended to be included within the scope of the invention.

I claim:

1. An adhesive composition for laminated paper products which comprises about 14% to about 25% by weight of a mixture of gelatinized starch and ungelatinized starch, the ratio of gelatinized starch to ungelatinized starch varying from about 17:3 parts by weight, respectively, to about 1:12 parts by weight respectively, and about .5 to 10% by weight of polyvinyl acetate, the remainder amount by weight being composed substantially of water.

2. An adhesive composition as claimed in claim 1 and further comprising a small amount of borax, and wherein said polyvinyl acetate is borax compatible.

3. An adhesive composition as claimed in claim 1 and further comprising limited amounts of caustic soda.

4. An adhesive composition, as set forth in claim 1, wherein the mixture of gelatinized and ungelatinized starch is in the ratio of 1 part by weight of gelatinized starch to about 6 parts by weight of ungelatinized starch.

5. An adhesive composition, as set forth in claim 4, wherein the mixture of gelatinized and ungelatinized starch comprises from about 14% to 21% by weight of said composition and the polyvinyl acetate comprises from about 1% to about 6% by weight of said composition.

6. An adhesive composition, as set forth in claim 5, wherein the mixture of gelatinized and ungelatinized starch comprises about 21% by weight of said composition and the polyvinyl acetate comprises about 1.5% of said composition.

7. An adhesive composition for laminated paper products which comprises about 14% to about 25% by weight of a mixture of gelatinized starch and ungelatinized starch, the ratio of gelatinized starch to ungelatinized starch varying from about 1:3 parts by weight, respectively, to about 1:8 parts by weight, respectively, and about .5 to 10% by weight of polyvinyl acetate, the remainder amount by weight being composed substantially of water.

References Cited in the file of this patent

UNITED STATES PATENTS

| | | |
|---|---|---|
| 2,650,170 | Kimball | Aug. 25, 1953 |
| 2,690,594 | Kirksey | Oct. 5, 1954 |
| 2,850,468 | Giggey | Sept. 2, 1958 |

OTHER REFERENCES

Kerr: "Chemistry and Industry of Starch," published by Academic Press Inc., New York, 1950, 2nd Edition, pages 596–598.